March 3, 1964 K. BISKIS 3,123,152
HITCH LINKAGE CONTROL MECHANISM
Filed Sept. 16, 1960 4 Sheets-Sheet 1
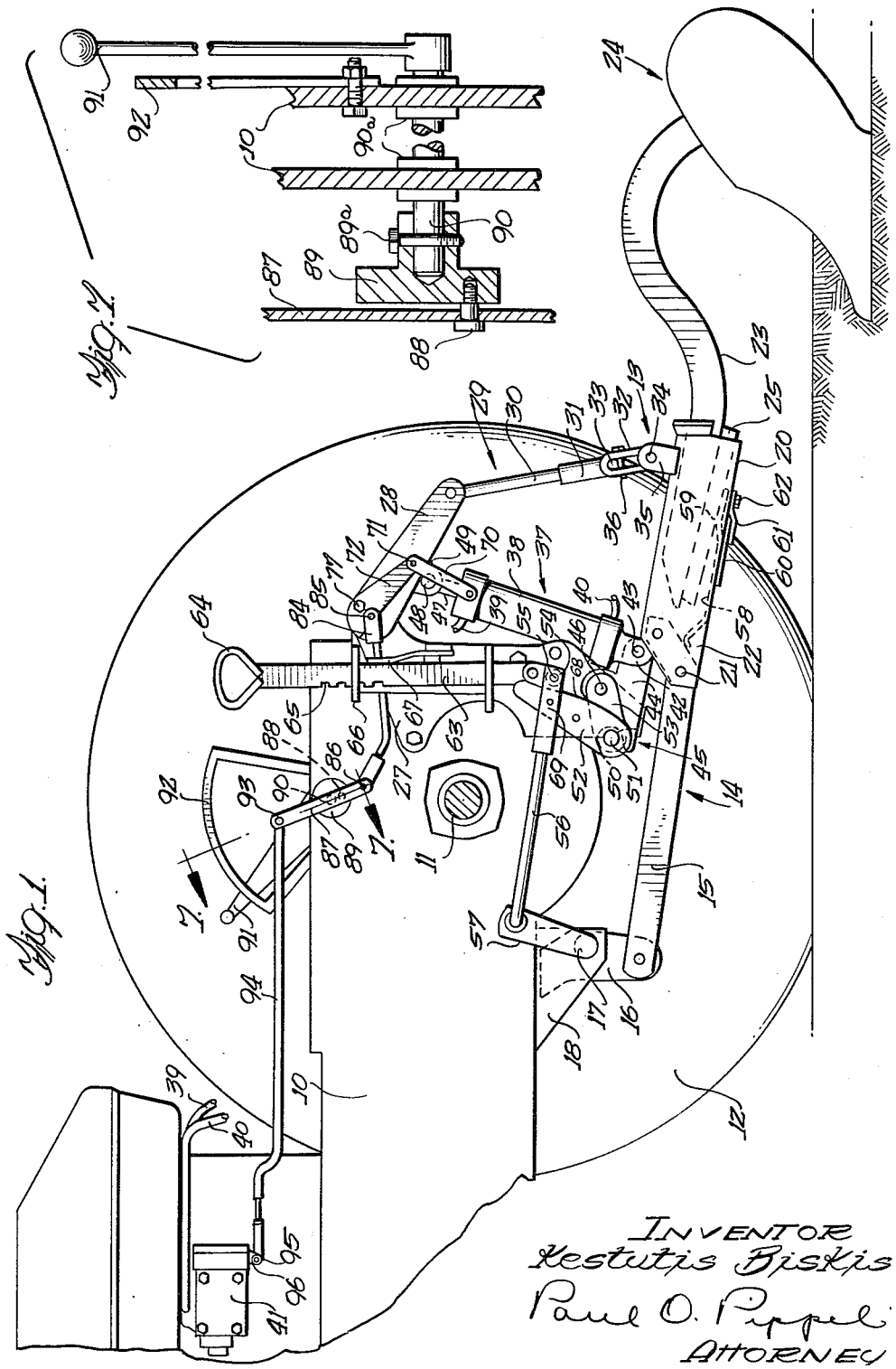
INVENTOR
Kestutis Biskis
Paul O. Pippel
ATTORNEY March 3, 1964 K. BISKIS 3,123,152
HITCH LINKAGE CONTROL MECHANISM
Filed Sept. 16, 1960 4 Sheets-Sheet 2
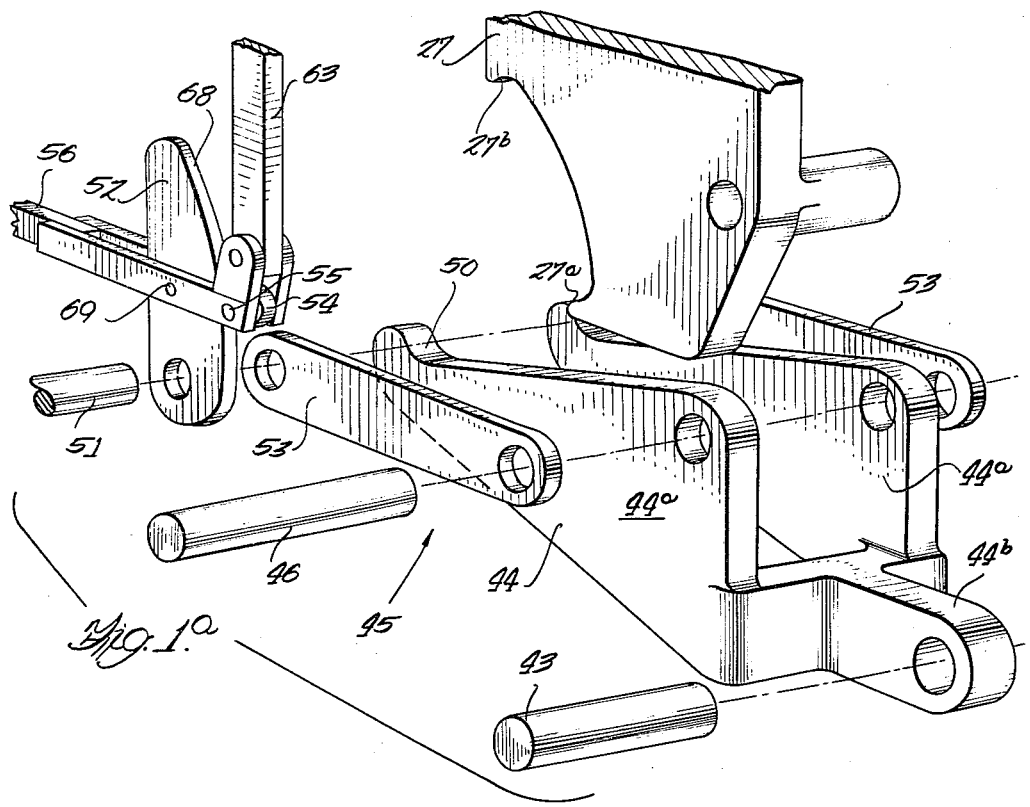
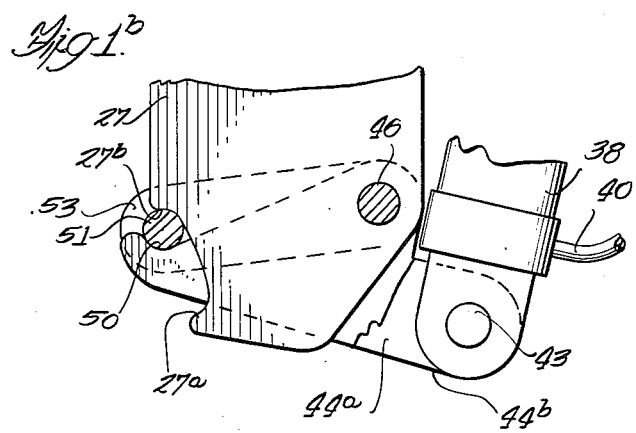
INVENTOR
Kestutis Biskis
Paul O. Pippel
ATTORNEY

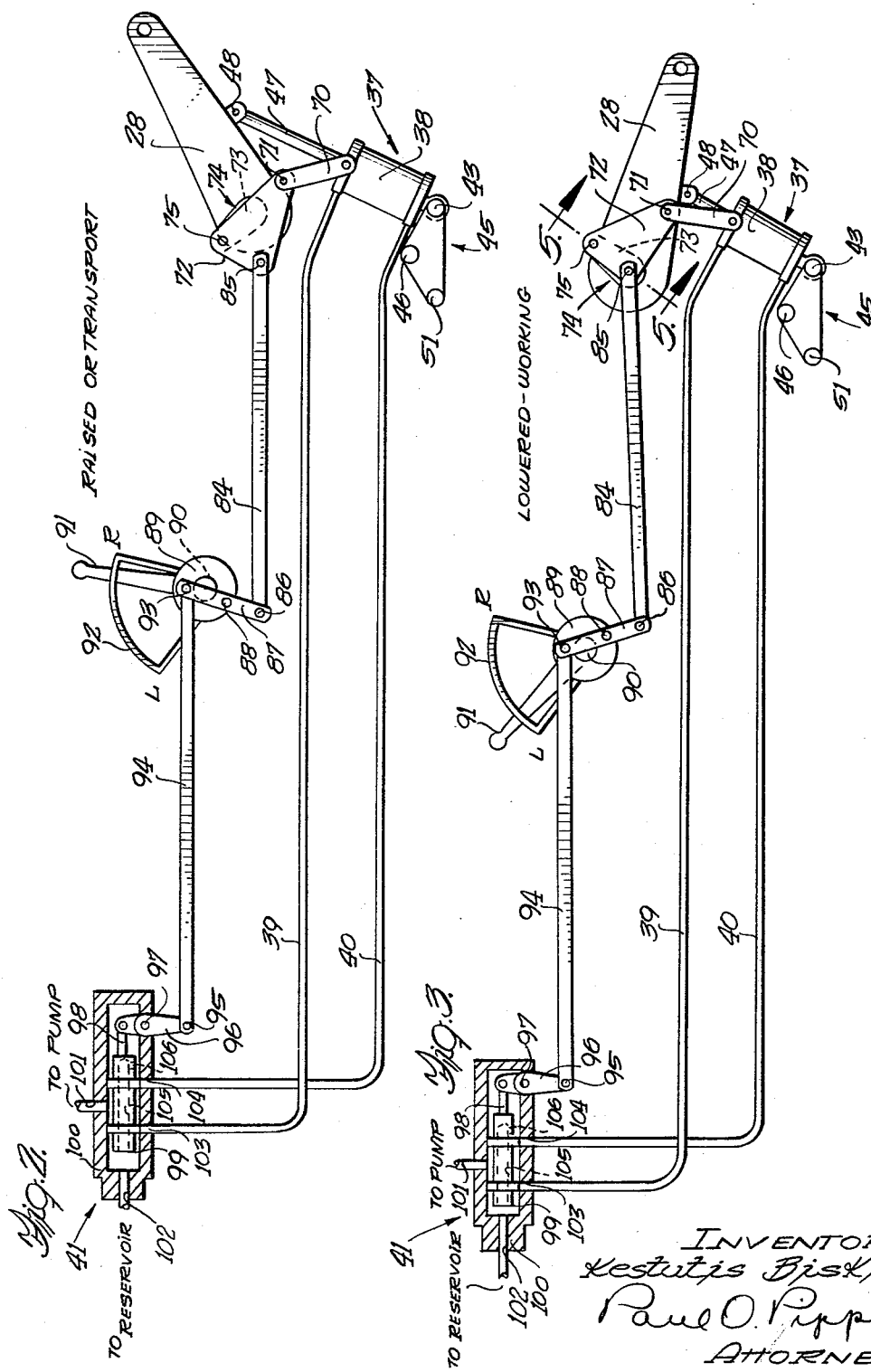

March 3, 1964    K. BISKIS    3,123,152
HITCH LINKAGE CONTROL MECHANISM
Filed Sept. 16, 1960    4 Sheets-Sheet 4
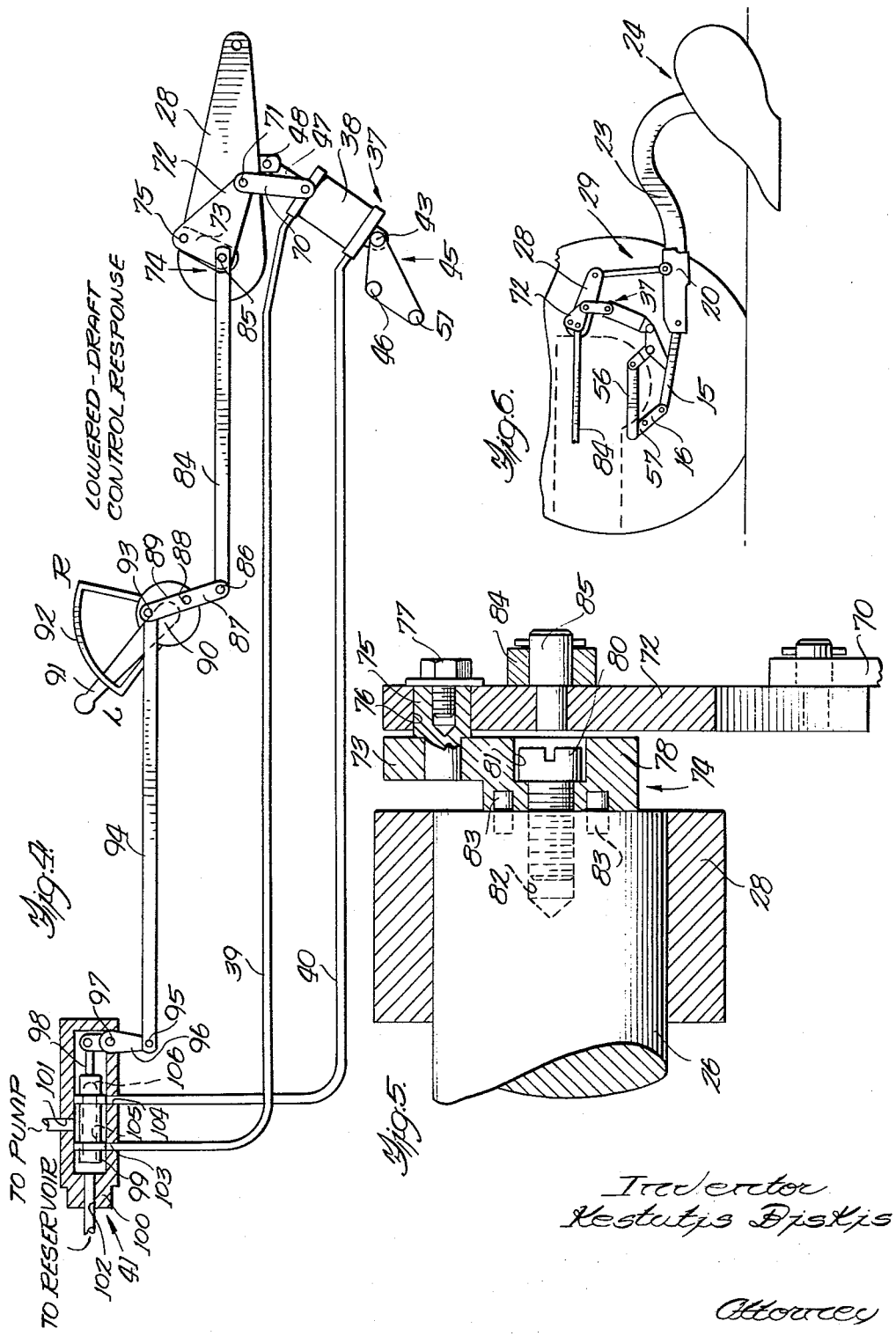

3,123,152
HITCH LINKAGE CONTROL MECHANISM
Kestutis Biskis, Downers Grove, Ill., assignor to International Harvester Company, Chicago, Ill., a corporation of New Jersey
Filed Sept. 16, 1960, Ser. No. 56,475
5 Claims. (Cl. 172—239)

This invention relates generally to an agricultural implement attaching apparatus adapted for attaching earth-working implements to a tractive vehicle such as a tractor and somewhat more particularly is concerned with tractor mounting implement means wherein the implement is carried by the tractor, and wherein means are provided for utilizing the draft forces acting upon the implement to maintain uniform operation of the earth-working tools in the ground. More specifically, however, the invention is directed to a novel compensating linkage mechanism interposed between the hydraulic power lift cylinder and the hydraulic lift control valve and operative for sensing and transmitting control signals therebetween for maintaining the attached implement at the most effective and desired working position under various soil conditions. The invention is particularly applicable to the weight transfer and draft control implement attaching apparatus for tractors, of the type disclosed in U.S. Patents No. 2,874,789, dated February 24, 1959, and No. 2,947,367 dated August 2, 1960, to which reference may be had for constructional details forming only environment for the invention as claimed herein.

A primary object of the present invention is to provide an improved, simplified and easily adjusted force-transmitting follow-up control linkage mechanism operatively interconnecting the lift cylinder with the control valve for transmitting sensing signals from the cylinder to the valve when forming part of a hydraulic lift system in association with an implement attaching mechanism.

An important object is to provide an accurate, reliable and sensitive valve control compensating linkage mechanism for a hydraulic lift system.

Another object is to provide a differential-type control linkage mechanism for a hydraulic power lift system which utilizes a single operator's control lever and is highly effective for use with an implement hitch mechanism that is operative to provide weight transfer or draft control for an attached earth-working implement.

A further object is to provide an improved and novel follow-up linkage mechanism employing a walking-beam and which is particularly applicable for a hydraulic lift system associated with implement attaching and draft control apparatus for a vehicle.

A still further object is to provide a follow-up linkage mechanism for a hydraulic lift system wherein the linkage has the ability to refrain from transmitting a sensing signal when the hydraulic power lift cylinder and the lift arms of the system move as a unit and without displacement therebetween and such movement is the result of a draft load variation on the attached implement, and to transmit a sensing signal only when there is relative movement or displacement between the hydraulic cylinder and the associated lift arms.

The foregoing and other objects and features of the invention will become apparent as the disclosure is more fully made in the following detailed description of a preferred embodiment of the invention as illustrated in the accompanying sheets of drawings in which:

FIGURE 1 is a view in side elevation of the rear portion of a tractor from one side thereof, with one wheel removed, showing implement attaching and draft control apparatus incorporating features of the present invention and having a moldboard plow connected thereto;

FIGURE 1a is a partially exploded and fragmentary perspective view shown in enlarged dimensions, of the bellcrank support mounting for the lower end of the hydraulic lift cylinders;

FIGURE 1b is a fragmentary side elevational view, in enlarged dimensions, of the bellcrank support mounting assembly;

FIGURE 2 is a schematic representation of the linkage control mechanism shown with the hitching apparatus in a raised or transport position and the control valve in a neutral position;

FIGURE 3 is a view similar to FIGURE 2 but showing the linkage control mechanism in a lowered working position and with the control valve in a neutral position;

FIGURE 4 is a view similar to FIGURES 1 and 2 and showing the mechanism in a lowered working position with draft load response and with the control valve in a neutral position;

FIGURE 5 is a vertical sectional view, in enlarged dimensions, taken along the line 5—5 of FIGURE 3;

FIGURE 6 is a diagrammatic view of a moldboard plow in operation and showing the implement attaching and draft control apparatus together with the linkage control mechanism in a position corresponding with an intermediate location between the uppermost and lowermost thereof; and FIGURE 7 is a vertical sectional view taken along the line 7—7 of FIGURE 1.

Referring now to the drawings, it will be noted that the implement attaching apparatus, selected for depicting a preferred application of an arrangement incorporating the present invention, is shown associated with a tractor (only fragmentarily shown) having a generally conventional longitudinally extending body or frame 10, rear axle structure 11 and laterally spaced rear drive wheels such as 12 and only one of which is shown.

The implement attaching hitch mechanism is shown only fragmentarily in the drawings because it is included only to show a preferred application of the invention and reference to the previously mentioned U.S. patents may be had for a more complete description of the structural details thereof. Suffice it to say that an articulated draft member or drawbar 13, may include a forward bail-like section 14 having laterally spaced forwardly converging arms, such as 15 (only one of which is shown), that are suitably connected together at the forward ends thereof and then may be connected by a suitable ball and socket joint (not shown) to the lower end of a hitch arm 16 that, in turn, is affixed to a shaft 17 which is rotatably mounted in a bracket 18 affixed to the body or frame 10 of the tractor and projecting downwardly therefrom. The drawbar or draft member 13 is thus connected in draft-receiving relation to the tractor through hitch arm 16, and by means accommodating longitudinal movement of the draft member, causing said arm to swing about the axis of shaft 17 in a longitudinal direction.

Draft member 13 may be fashioned to include an articulated rear section in the form of laterally spaced longitudinally elongated socket members 20 (only one of which is shown) wherein each of which is pivotally connected, by a pivot pin such as 21, to a respective arm 15, and the rear end of each such arm may be bent upwardly to form an extension, such as 22, that functions as a stop by engaging the upper portion of the associated socket member to limit the downward swing about the axis of the pin 21 of the socket member relative to the bail.

Each socket member 20 is adapted to slidably receive one of the laterally spaced complementary longitudinally elongated shafts 23 (only one of which is shown), of an earth-working implement, such as the moldboard plow indicated generally at 24, and each such socket may be provided with a base in the form of a bar 25 affixed thereto which terminates short of the forward end of the socket and forms a support for the lower surface of said shaft member. The forward end of each of the elongated shafts 23 is usually tapered and beveled and the bar 25 extends forwardly and upwardly from the rear end of said socket member to conform to the taper of the lower surface of the shaft 23, while both said bar and shaft terminate short of the forward end of said socket member to avoid engagement with extension 22 of the forward bail section 14. It is understood, of course, that suitable conventional means may be provided for detachably locking the implement shafts in the respective socket member so that the entire weight of the implement may be supported on the tractor, such as in the transport position, but, since this feature forms no part of the present invention, the details thereof need not be illustrated or described herein.

Vertical movement of the draft member 13 may be accomplished by power lift means which includes a transversely extending rockshaft 26 (FIGURE 5) suitably mounted in bearings (not shown) at the upper end of transversely spaced brackets, such as 27 (FIGURE 1), only one of which is shown, affixed to opposite sides of the tractor body 10. A lift arm, such as 28 is affixed to each end of the rockshaft 26 and extends rearwardly therefrom and the free end of each such arm is pivotally connected to the upper end of an associated lift link 29. Each lift link member may comprise a shaft portion 30 slidably removable in a sleeve member 31 having a lower clevis portion 32 providing a slot for the sliding reception of a cross-head 33 on the lower end of said shaft 30 to prevent its displacement from sleeve 31 while accommodating sliding movement thereof in said clevis. The lower end of clevis 32 is mounted upon a pivot pin 34 carried by a lug-like bracket 35 affixed to and projecting upwardly from a respective socket member 20. When certain types of implements are mounted on the tractor, it is desirable that the draft structure 13 be allowed to float freely in a vertical plane about the axis of its connection to the frame and this may be accomplished through the telescoping links such as 29. However, in the case of a moldboard plow, such as that illustrated herein, it is desirable that it be held against tilting about a longitudinal axis so that the levelling adjustments selected can be maintained, and this may be accomplished by means of a pin 36 passed through a suitable opening provided in clevis 32 and adapted to engage the lower surface of cross-head 33.

Raising and lowering of draft structure 13 to vertically move the implement connected thereto between operating and transport positions or to adjust the depth of the implement's operation, may be effected by means of power derived from the tractor power plant and transmitted by means of fluid under pressure supplied from a tractor power source (not shown), and delivered to an expandible and contractible hydraulic ram 37. Said ram may include a cylinder 38 receiving fluid under pressure through conduit lines 39 and 40 by way of a control valve 41, and having at its lower end a clevis 42 anchored to a pivot pin 43 carried at the end of one arm 44 of a rockable member or lever in the form of a bellcrank 45 fulcrumed upon a pivot pin 46 carried in a suitable bearing at the lower end of bracket 27. The arm 44 may be fashioned to resemble a clevis or bail-like arrangement with spaced-apart parallel portions such as 44a, 44a extending forwardly from a solid stem portion such as 44b. Admission of fluid under pressure to the cylinder 38, in the position of the parts indicated in FIGURE 1, extends piston rod 47 which is pivotally mounted upon a pin 48 carried by a lug-like bracket 49 affixed to lift arm 28. Extension of the piston rod in the cylinder moves the implement attaching apparatus and therefore its connected implement from a lowered position, such as is indicated in FIGURE 1, to the transport position indicated in FIGURE 2.

The specific structure of bellcrank 45 is more particularly described in the related U.S. Patent No. 2,874,789 and is additionally shown in greater detail in FIGS. 1a and 1b and reference may be had thereto for a more complete understanding thereof. Suffice it to say here that said bellcrank member has the forward upwardly facing edge thereof curved to form a recess as shown at 50 and disposed to disengageably receive the shaft 51 which has securedly affixed thereto the lower end of a lever arm 52 forming the other arm of the bellcrank 45. The shaft 51, in turn, is fixedly secured to a pair of spaced apart links, such as 53, which are pivotally connected at the opposite ends thereof to the pivot pin 46. As thus formed said bellcrank is fashioned in separate and rotatable parts both of which are pivotable about the pivot pin 46. The lever arm 52 together with the shaft 51 and links 53 may pivot upwardly about the pin 46 without engaging the one arm portion of the bellcrank member but when said lever arm pivots downwardly about said pin the shaft 51 engages the curved edges 50 of the said one arm portion of the bellcrank member and carries the remainder of said bellcrank with it about the pin 46 until the shaft 51 engages a lower curved edge portion 27a, of the bracket 27, which functions as a stop to limit further movement thereof in this direction. By a similar action the one arm 44 of the bellcrank may rotate rearwardly about the pin 46 separately from the lever arm 52, shaft 51 and links 53 but when this one arm portion rotates forwardly the curved edges 50 thereof engage the shaft 51 causing it to rotate with its connecting links 53 and lever arm 52 about the pin 46 until the shaft 51 engages an upper curved edge portion 27b, of the bracket 27, which thereupon provides a stop to limit further movement of the bellcrank in that direction.

The rear edge of lever arm 52 is a curved camming surface engaged by a block-like follower 54 mounted on a pin 55 carried at the end of a thrust rod 56, the forward end of which is bent laterally for reception in an opening in an arm 57 affixed to and projecting upwardly from shaft 17, and forming with hitch arm 16 a lever pivoted medially of its ends by which a draft load reaction is transmitted to bellcrank 45. Thus, arms 16 and 57 constitute a lever fulcrumed in the middle thereof, so that a rearward pull upon the draft member 13, due to excess draft encountered by the implement, causes the shaft 17 to rock in a counterclockwise direction, as viewed in FIGURE 1, transmitting a forward thrust to rod 56 and, acting through follower 54 as an abutment engaged by cammed arm 52, to exert a force in a direction to rock the rockable member or bellcrank 45 in a counterclockwise direction, as viewed in FIGURE 1, about the axis of its fulcrum 46. This rocking of the bellcrank 45 causes the hydraulic ram 37 to function as a thrust link and exert a force in an upward direction against the lift arm 28 and rockshaft 26 to lift the draft structure and the implement connected thereto.

The implement's own draft pull is thus utilized to exert a lifting effect thereon, the weight taken from the implement in this manner being transferred to the tractor by adding down pressure to the rear drive wheels and causing them to more aggressively engage the ground so that the full power of the tractor can be utilized to pull the implement through the ground, all as is well understood in the art.

Each of the socket members 20 may be biased to a position in general alignment with its respective arm 15 by the provision of a leaf spring 58 which has an offset section 59 engaging the under surface of bar 25 and held in place by a pair of spring sections 60 and 61 secured to spring 58 and the socket base by a bolt 62, the forward end of spring 58 being bent upwardly to engage extension 22. This arrangement, it will be appreciated, facilitates reception therein of the shafts of the implement when attaching said implement to the tractor.

It will be understood, of course, that suitable conventional means may be provided to limit lateral swinging of the implement relative to the tractor, but, since such provides no part of the present invention, the details thereof have not been shown or described herein.

The amount of weight it is desirable to transfer from the implement to the tractor may be varied as is well understood, and in this instance, such may be accomplished by a re-positioning of the follower 54 with respect to the lever arm 52. The follower 54 is pivotally mounted on pin 55 upon which is also mounted the lower end of an adjusting member 63 having a handle at its upper end accessible to the vehicle operator. Notches 65 in said member may be positioned to engage the bracket 66, and leaf spring 67 is disposed so as to bias said member into engagement with a selected one of said notched recesses. By moving the adjusting handle member up and down relative to the bracket 66, the position of the follower 54 may be varied with regard to the lever arm 52, the rear edge 68 of said lever arm being in the form of a longitudinally extending slightly curved camming surface and the position of follower 54 with respect thereto, as shown in FIGURE 1, providing a longer or shorter lever arm and concurrent with such change in lever arm, a varied amount of weight transfer becomes effective. Registering apertures such as 69 in arm 52 and thrust rod 56 make it possible to lock out the weight transfer mechanism when its function is not otherwise required.

Now, in accordance with the more specific teachings of the present invention there is provided a differential linkage control or follow up mechanism which is operative to sense and thereafter transmit signals to the hydraulic control valve 41 and thereby, in turn, effect suitable adjustment to the power lift means responsive to said signals.

A compensator link 70 is pivotally connected at one end thereof to the upper end of the hydraulic ram unit 37 and the opposite end of said link is pivotally connected by a pin 71 to one end of a compensator arm member 72 which, in turn, is pivotally connected, at a point proximate the opposite end thereof, to the free outer end of a crank arm 73 formed as part of a pivot plate member indicated generally at 74. A pivot pin 75 (FIGURE 5) has one end thereof anchored in the crankarm 73 of said pivot plate and the other end thereof is pivotally received in an aperture 76 in the compensator arm 72 and retained therein by suitable securing means such as the bolt and washer indicated at 77.

The pivot plate 74 is fashioned with a hub portion 78 thereon that is disposed in abutting relation with an end face 79 of the rockshaft 26, and a screw member 80, has the head thereof recessed in a countersunk aperture 81 in said plate, while the shank thereof extends into a threaded recess 82 in one end of said rockshaft so that the screw may be pulled up tightly to fixedly secure the plate to the rockshaft. In addition, a pair of diametrically spaced removable dowel pins 83 may be axially positioned, as shown in FIGURE 5, to rotatively interlock these members and thus prevent rotation of said plate relative to said rockshaft, and vice-versa. The pivot plate 74 constitutes what, in effect, is termed a position-responsive member, since it is constrained for rotative movement with the rockshaft 26 and as thus arranged follows with fidelity the raising and lowering movements of the attached implement and thereafter translates the indicated position of the implement to motion-transmitting mechanism interconnecting the lift means and the control valve means.

A rear actuating rod or link member 84 has the rearward end thereof pivotally connected to the compensator arm by means of a stud or pin 85 anchored in said compensator arm at a point unequally spaced from the other pivotal connections of said compensator arm and disposed so that a line drawn between the pivot connections 71, 75 and 85 of the compensator arm would form an elongated triangle with the apex of the triangle located at the point 71. It is preferable, of course, although not a strict requirement to do so to have the distance from the axis of pivot 85 to the axis of pivot pin 71 substantially approximate that of the radius of an arc described by the pin 48 about the axis of the rockshaft 26 for reasons which will subsequently be apparent. As formed the compensator arm also constitutes, in effect, a bellcrank with angled-apart arms and having the apex thereof at pivot point 75. The opposite or forward end of the rear actuating rod 84 is pivotally connected by a pin 86 to one end of a walking beam member 87 which is eccentrically and pivotally mounted, at a point intermediate its ends, on a pin 88 anchored off-center from the rotative axis thereof in an eccentric member 89 carried by a shaft 90 and constrained for rotation therewith by a pin such as 89a (FIG. 7). The shaft 90 is suitably journalled in bearings 90a that are mounted on the tractor frame 10, while the opposite end of the shaft is provided with an operator's hand control lever 91 which cooperates with a quadrant scale member 92 suitably affixed to the tractor in the vicinity of said hand lever. The opposite end of the walking beam 87 is pivotally connected at 93 to one end of a forward actuating rod or link member 94 whose opposite or forward end is pivotally connected at 95 to a valve actuating lever 96 pivoted at 97 and having the opposite end thereof pivotally connected to the piston rod 98 that, in turn, connects with the piston 99 of control valve 41.

The control valve 41 is of generally conventional and well known construction and includes a housing or casing that forms a cylinder 100 that slidably receives the piston 99 therewithin. A port opening 101 may communicate wtih a suitable hydraulic pump (not shown), while another port opening 102 may communicate with the return flow and fluid reservoir (not shown) as is well understood. Port openings 103 and 104 communicate, respectively, with the conduit lines 39 and 40 which connect with the hydraulic ram cylinder 38, and an axially extending recess 105 connects with a radial opening 106 in the piston of said valve to provide a portion of the return flow passage from the port opening 104 and conduit 40 to the reservoir. In the present invention the various elements of the mechanism have been so proportioned that the geometry thereof operates to maintain pivot 85 substantially coaxial with the rotative axis of rockshaft 26 throughout the operating range of the draft responsive feature of the mechanism as will subsequently be explained.

*Operation*

The operation of the proposed follow-up linkage mechanism is first described as employed in the sensing and transmitting of signals created during the position-responsive control or operational phase of a hydraulic power lift system. Assume now that the relative positions of the components of the lift system are, as indicated in FIGURE 2, in the transport position and it is desired to lower the implement to a working position, such as is represented in FIGURES 1 and 3. To accomplish this the operator's hand lever 91 is urged forwardly, to the left as viewed in the drawings, along the quadrant scale 92, whereupon the shaft 90 and its associated eccentric member 89 are rotated counterclockwise. Such rotation of eccentric 89 causes the mounting pin 88 thereon to likewise rotate counterclockwise and carry with it the pivotally attached walking beam 87, and, since the lower end of said beam can not move or be displaced fore and aft, because of its interconnection with the yet unmoved compensator arm 72, the upper end of said beam is displaced rearwardly thus causing the forward actuating rod 94, pivotally attached thereto, and its interconnected valve actuating lever 96 to be carried therewith, whereupon said latter lever rotates about its pivot 97 and slides the piston rod 98 and piston 99 of control valve 41 forwardly. This piston movement causes fluid under pressure to be directed through said valve and into the conduit 39 that communicates with the upper end of hydraulic ram cylinder 38, while simultaneously therewith the lower end of said cylinder is placed in free communication, through conduit line 40 and valve 41, with the return flow reservoir portion of the hydraulic lift system (not shown). Hydraulic fluid pressure in the upper portion of the ram cylinder 38 then becomes effective to start rotation of the lift arms 28 together with the rockshaft 26 so as to lower said arms and thereby drop the attached implement to the desired working depth or operating position. As the lift arms 28 are lowered the attached rockshaft 26 rotates clockwise and carries with it the securely affixed pivot plate member 74 upon which is pivotally and rockably mounted or fulcrumed the compensator arm 72 that, in turn, is pivotally connected to the rear actuating rod 84 and to the compensator link member 70. Clockwise rotation of pivot plate arm 73 causes a counterclockwise rotation of the compensator arm 72 about the pivotal pin connection 75 and this, in turn, effects a rearward movement or displacement of the pivotally attached rear actuating rod 84. Such movement of rod 84 then causes the attached walking beam 87 to rotate counterclockwise about its eccentrically mounted pivot pin 88 and in so doing to move the forward actuating rod 94 forwardly, and then when the implement has attained the desired depth, as predetermined by the selected position of hand lever 91 relative to quadrant 92, the control valve 41 will concurrent therewith have been restored to its neutral position.

Now, in order to raise or lift the implement, the operator's hand lever 91 is moved to the right, from the position shown in FIGURE 3, whereupon the front actuating rod 94 is displaced forwardly and the valve 41 is conditioned to admit fluid pressure through conduit 40 to the lower portion of ram cylinder 38, while simultaneously the upper portion of the cylinder establishes free communication by way of conduit 39 and valve 41 with the return flow reservoir. This causes the lift arms 28 to raise and concurrent therewith rotate rockshaft 26 counterclockwise which rotative movement causes the pivotally attached compensator arm member 72 to rotate clockwise about pivot 75 relative to the pivotally attached pivot plate 74, and as this rotation proceeds the rear actuating rod 84 is displaced forwardly causing the walking beam 87 to rotate clockwise about its eccentrically positioned pivot 88, whereupon the forward actuating rod 94 is retracted and when the desired height of the lift arms 28 has been attained, as predetermined by the selected position of hand lever 91, the control valve 41 will concurrent therewith have been restored to its neutral position.

Normally, the position-responsive control or operational phase of the hydraulic power lift system does not require compensation or cancelling signal action ability in its follow-up mechanism, because only the hydraulic action of the ram cylinder is effective for causing a displacement of the lift arms and the associated rockshaft thereof. However, when a lower pivotal mounting connection, such as 43, of the ram cylinder 38 is displaced, as a result of rotation of the bell-crank 45 about its pivot 46, and the cylinder is simultaneously displaced upwardly as a thrust unit, i.e. without any relative displacement movement between the cylinder and the associated lift arms 28, from the position indicated in FIGURE 3 to a position such as is represented in FIGURE 4, or to any position intermediate the positions shown in these figures, the proposed follow-up linkage will not transmit a sensing signal to the control valve 41 despite a rotative displacement of the position-responsive member thereof. A movement or displacement of this character may be caused by float of the bellcrank 45, or by operation of the traction control feature of the mechanism whereby changes in a draft load on the implement causes the draft structure 13 to rotate the bellcrank 45 about its pivot 46 and thereby effect an upward displacement of the pivotal connection 43 and of the attached cylinder unit.

Assume next a working condition such as is represented by the relative positions of the components illustrated in FIGURE 3 with the implement then encountering a soil condition such as will impose an excessive draft load thereon. In this case the drawbar structure 13 is forced to move rearwardly and, acting through the interconnected mechanism of the hitch arm 16, arm 57, thrust rod 56 and the cammed lever 52, causes the bellcrank 45 to rotate counterclockwise about the pivot connection 46. This rotative movement forces the cylinder unit 37 upwardly and, acting as a thrust member, forces the lift arms 28 to move upwardly therewith. As the cylinder unit moves it carries with it the attached compensator link 70, and, since there is no relative displacement movement between the cylinder and said lift arms, there would be substantially no relative movement between the compensator arm 72, the pivot plate 74 or the rockshaft 26 if the relative positions of said lift arms and said cylinder were such that the pivots 71 and 43 were coaxial. In the proposed linkage the pivots 71 and 48 are not exactly coaxial, although they approximate being so, hence when the cylinder unit moves as described there will be a small or limited movement of the compensator arm member 72 relative to the pivot plate member 74 thus causing a slight displacement of the pivot 85 from its initial position substantially coaxial with the rotative axis of rockshaft 26. However, since the amount of this displacement horizontally is substantially negligible and vertically is very limited when the position of the implement is such that it is subjected to draft loads and the changes therein, and since said limited displacement of pivot 85 occurs at the end of arm 84, which pivots about a relatively long vertical arc and which together with the inherent slack or backlash in the linkage and overlap in the control valve lands relative to the respective body bores will readily absorb such limited displacing movement, rear actuating rod 84, and no motivating signal will be transmitted to the control valve 41; hence said valve will be permitted to remain in the neutral position. When the excessive draft load is removed, the draft structure 13 will then permit the power lift mechanism to return to its previously selected working depth without transmitting any signal to the control valve 41 such as might cause the actuation thereof. When the device is operating in its position control range with the draft load negligible because the implement is substantially out of the ground, the relative positions of the lift arms 28 and cylinder 38 will be such that the pivots 71 and 48 do not approximate being coaxial and the compensator arm 72 will be rotated clockwise about its pivot 75 and a signal may be transmitted as heretofore mentioned.

It has been found in a commercial application of the proposed linkage presently in use that when the mechanism is moved as a result of draft load changes from the relative positions of the components as represented in FIG. 3 to those represented in FIG. 4 the amount of horizontal displacement of pivot pin 85 is substantially negligible while the vertical displacement of said pin although somewhat greater is also extremely limited, and further, that a small area of dead space exists around the axis of the rockshaft and that for any position of pivot pin 85 falling within said area no sensing or motivating signal will be transmitted to the control valve 41.

Since the draft responsive feature is only effectively operative when the implement is in the ground it will be appreciated that only a limited portion of the operating range of control lever 91 will be involved with the reaction of the draft responsive mechanism and likewise only a limited range of the expandable facility of the cylinder 38 will be involved, hence when the lift arms move an appreciable distance from said cylinder so that the implement is out of the ground and no longer subject to draft load reaction then only the position-responsive feature of the mechanism will be of importance. Under this circumstance the displacement of pivot 85 off the rockshaft axis may be sufficient, as previously noted, to provide a sensing signal to the control valve.

While only one form of the invention has been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims:

What is claimed is:

1. In a tractor having implement-attaching mechanism for supportably attaching an implement thereto, a lift means mounted on the tractor and operable for raising and lowering said implement, a position-responsive member affixed to and constrained for rotative movement with said lift means and operable by said lift means attendant the raising and lowering movements of the implement, draft-responsive mechanism constituting a portion of said implement-attaching mechanism and which is susceptible to movement upon being subjected to variations in draft loads on the implement and including a lever arm rotatable attendant such movement, a power unit having portions expandable and contractible relative to one another with one such portion pivotally connected to said lever arm and another such portion pivotally connected to said lift arm and in which said unit is selectively expandable and contractible for raising and lowering said lift means and alternatively operable as a rigid member for constraining the movements of said lever arm and lift means with one another when such movements are the result of variations in draft loads, and control valve means actuable for controlling the operation of said power unit, the improvement comprising: followup mechanism interconnecting said control valve means, said position-responsive member and said power unit for effecting actuation of said control valve means responsive to certain movements of said position-responsive member and for preventing actuation of the control valve means responsive to certain other movements of said position-responsive member; said followup mechanism including a first force-transmitting means interconnecting said control valve means and said position responsive member and operative for actuating said control valve means in accordance with movements of said position-responsive member that result from expansion and contraction of the respective portions of said power unit, and a second force-transmitting means interconnecting said one such portion of said power unit and said first force transmitting means and cooperative therewith in such manner as to cause said first force-transmitting means to be inoperative for effecting the actuation of said control valve means in response to movements of said position-responsive member when such movement is produced by a movement of said draft-responsive mechanism resulting from variations in draft loads on the implement.

2. In a tractor having implement-attaching mechanism for supportably attaching an implement thereto, a lift means mounted on the tractor and operable for raising and lowering said implement, a position-responsive member affixed to and constrained for rotative movement with said lift means and operable by said lift means attendant the raising and lowering movements of the implement, draft-responsive mechanism constituting a portion of said implement-attaching mechanism and which is susceptible to movement upon being subjected to variations in draft loads on the implement and including a lever arm rotatable attendant such movement, a power unit having portions expandable and contractible relative to one another with one such portion pivotally connected to said lever arm and another such portion pivotally connected to said lift arm and in which said unit is selectively expandable and contractible for raising and lowering said lift means and alternatively operable as a rigid member for constraining the movements of said lever arm and lift means with one another when such movements are the result of variations in draft loads, and control valve means actuable for controlling the operation of said power unit, the improvement comprising: a selectively positionable control lever; a tractor mounted support for said control lever; a plate member rockably mounted on said position-responsive member; a walking-beam having one end thereof connected by one link with said control valve means and the other end thereof connected by another link with said plate member; said control lever having a portion thereon affording a fulcrum for said walking-beam and which fulcrum is shiftable about the axis of rotation of said control lever; said control lever being manually shiftable for initially actuating said control valve means, and having said control valve means subsequently actuated through the interconnected links, walking-beam and plate member responsive to the movements of said position-responsive member when said movements result from expansion and contraction of the respective portions of said power unit; additional link means interconnecting said one such portion of said power unit and said plate member and operative for rotating said plate member about the rotative axis of said position-responsive member in a direction such as will maintain the connection of said another link with said plate member substantially coaxial with the rotative axis of said position-responsive member so that the interconnecting links and walking-beam members will not effect an actuation of said control valve means upon movement of said position-responsive member and of the lever arm to which said one such portion of said power unit is connected when such movement results solely from variations in draft loads on the implement.

3. In a tractor having implement-attaching mechanism for supportably attaching an implement thereto, a lift means mounted on the tractor and operable for raising and lowering said implement, a position-responsive member affixed to and constrained for rotative movement with said lift means and operable by said lift means attendant the raising and lowering movements of the implement, draft-responsive mechanism constituting a portion of said implement-attaching mechanism and which is susceptible to movement upon being subjected to variations in draft loads on the implement and including a lever arm rotatable attendant such movement, a power unit having portions expandable and contractible relative to one another with such portion pivotally connected to said lever arm and another such portion pivotally connected to said lift arm and in which said unit is selectively expandable and contractible for raising and lowering said lift means and alternatively operable as a rigid member for constraining the movements of said lever arm and lift means with one another when such movements are the result of variations in draft loads, and control valve means actuable for controlling the operation of said power unit, the improvement comprising: a selectively positionable control lever; a tractor mounted support for said control lever; a compensator member fulcrumed on said position-responsive member at a point radially displaced from the rotative axis of said position-responsive member and operative for movement with said latter member; a walking-beam having one end thereof connected by one actuator rod with said control valve means and the other end thereof connected by another actuator rod with said compensator member; said control lever having a portion thereon affording a fulcrum for said walking-beam and which fulcrum is shiftable about the axis of rotation of said control lever; said control lever being manually shiftable for initially actuating said control valve means, and having said control valve means subsequently actuated through the interconnected actuator rods, walking-beam and compensator member responsive to the movements of said position-responsive member attendant the raising and lowering of said attached implement resulting from expansion and contraction of the respective portions of said power unit; rigid link means connecting said one such portion of said power unit and said compensator member, and being cooperative with said latter member for rotating said latter member about the rotative axis of said position-responsive member in a direction such as will maintain the connection of said another actuator rod with said compensator member substantially coaxial with the axis of rotation of said position-responsive member and thereby prevent the interconnected actuator rods, walking-beam and compensator member from actuating said control valve means when the portions of said power unit operating as a rigid unit cause the power unit and said lift means to move as a unit without relative displacement therebetween and such movement results from variations in draft loads on the implement.

4. In a tractor having implement-attaching mechanism for supportably attaching an implement thereto, a lift means mounted on the tractor and operable for raising and lowering said implement, a position-responsive member affixed to and constrained for rotative movement with said lift means and operable by said lift means attendant the raising and lowering movements of the implement, draft-responsive mechanism constituting a portion of said implement-attaching mechanism and which is susceptible to movement upon being subjected to variations in draft loads on the implement and including a lever arm rotatable attendant such movement, a power unit having portions expandable and contractible relative to one another with one such portion pivotally connected to said lever arm and another such portion pivotally connected to said lift arm and in which said unit is selectively expandable and contractible for raising and lowering said lift means and alternatively operable as a rigid member for constraining the movements of said lever arm and lift means with one another when such movements are the result of variations in draft loads, and control valve means actuable for controlling the operation of said power unit, the improvement comprising: a selectively positionable control lever; a tractor mounted support for said control lever; a compensator member fashioned to constitute a bellcrank with two angled-apart arm-like portions and having the apex thereof fulcrumed on said position-responsive member at a point radially displaced from the rotative axis of said member for movement with said member; a beam member having an end thereof connected by a first link with said control valve means and another end thereof being pivotally connected by a second link to one arm-like portion of said compensator member; said control lever having a portion thereon affording a fulcrum for said beam member and which fulcrum is shiftable about the axis of rotation of said control lever; said control lever being manually shiftable for initially actuating said control valve means, and said control valve means thereafter through the interconnected said links, beam and compensator member being actuated responsive to the movements of said position-responsive member attendant a raising and lowering of the attached implement resulting from expansion and contraction of said power unit; a compensator link having an end thereof pivotally connected to said one such portion of said power unit for movement therewith and having another end of said latter link pivotally connected to the other arm-like portion of said compensator member; said compensator link being operative upon movement of said position-responsive member and of the lever arm to which said one such portion of said power unit is connected for rotating said compensator member about the rotative axis of said position-responsive member in a direction such as will maintain the pivotal connection of said second link to said one arm-like portion of said compensator member substantially coaxial with the rotative axis of said position-responsive member so as not to effect actuation of said control valve means when such movement of the position-responsive member results solely from variations in draft loads on the implement.

5. In a tractor having implement-attaching mechanism for supportably attaching an implement thereto, a lift means mounted on the tractor and operable for raising and lowering said implement, a position-responsive member affixed to and constrained for rotative movement with said lift means and operable by said lift means attendant the raising and lowering movements of the implement, draft-responsive mechanism constituting a portion of said implement-attaching mechanism and which is susceptible to movement upon being subjected to variations in draft loads on the implement and including a lever arm rotatable attendant such movement, a power unit having portions expandable and contractible relative to one another with one such portion pivotally connected to said lever arm and another such portion pivotally connected to said lift arm and in which said unit is selectively expandable and contractible for raising and lowering said lift means and alternatively operable as a rigid member for constraining the movements of said lever arm and lift means with one another when such movements are the result of variations in draft loads, and control valve means actuable for controlling the operation of said power unit, the improvement comprising: motion-transmitting mechanism interconnecting said control valve means, said position-responsive member and said power unit for effecting actuation of said control valve means responsive to certain movements of said position-responsive member and for preventing actuation of the control valve means responsive to certain other movements of said position-responsive member; said motion-transmitting mechanism including, a first force-transmitting means pivotally connected to an end thereof to the control valve means and operable to effect the actuation of said latter means, a second force-transmitting means pivotally connected at an end thereof to the said one such portion of the power unit for movement therewith and a third force-transmitting means fulcrumed on said position-responsive member and adapted for rotative movement therewith and being pivotally connected with other ends of each of said first and second means, and having said mechanism operative for actuating said control valve means responsive to movements of said position-responsive member resulting from expansion and contraction of the respective portions of said power unit while being alternatively operable so as not to effect actuation of said control valve means responsive to movements of said position-responsive member caused by movements of said draft-responsive mechanism resulting from variations in draft loads on the implement.

References Cited in the file of this patent
UNITED STATES PATENTS

| | | |
|---|---|---|
| 2,947,367 | Orelind et al. | Aug. 2, 1960 |
| 2,964,113 | Presnell et al. | Dec. 13, 1960 |